United States Patent [19]

Hermans

[11] 4,180,641

[45] Dec. 25, 1979

[54] BISPIPERAZIDO PHOSPHORUS POLYAMIDES

[75] Inventor: Johny C. Hermans, Wespelaar, Belgium

[73] Assignee: s.a. Texaco Belgium n.v., Brussels, Belgium

[21] Appl. No.: 919,106

[22] Filed: Jun. 26, 1978

Related U.S. Application Data

[62] Division of Ser. No. 628,262, Nov. 3, 1975, Pat. No. 4,098,768.

[30] Foreign Application Priority Data

May 21, 1975 [GB] United Kingdom ............... 21974/75

[51] Int. Cl.² .............................................. C08G 77/26

[52] U.S. Cl. ....................................... 528/27; 528/28; 528/41

[58] Field of Search .............................. 528/27, 28, 41

[56] References Cited

PUBLICATIONS

Bello et al.–Macromolecules, vol. 3, 1970, pp. 98–100.

*Primary Examiner*—Harold D. Anderson
*Attorney, Agent, or Firm*—Thomas H. Whaley; Carl G. Ries; Carl G. Seutter

[57] ABSTRACT

Novel polymers, useful as films or filaments, are prepared as by the reaction of a bispiperazide with a reactive derivative of an acid.

12 Claims, No Drawings

BISPIPERAZIDO PHOSPHORUS POLYAMIDES

This is a division of application Ser. No. 628,262, filed Nov. 3, 1975, now U.S. Pat. No. 4,098,768.

BACKGROUND OF THE INVENTION

This invention relates to novel polymers and to a process for the preparation thereof. These polymers are polyamides which contain phosphorus atoms as part of the main polymer chain.

This invention also relates to shaped articles, such as films and filaments, formed from these polymers.

The simplest polyamides are those obtained by the self-condensation of lactams, e.g. nylon-6 obtained from caprolactam, and those obtained by condensing a diamine with a dicarboxylic acid or acid derivative, e.g. poly(hexamethylene adipamide) or nylon-66. Whilst simple polymers of this type have many advantages of strength and resistance to harmful and degradative influences of many types, they also have many shortcomings, and even disadvantages, and continual effort has been expended both on improving the properties the polyamides intrinsically possess, and on imparting properties which the simple polyamides do not possess.

For instance, polyamides can be synthesized from mixtures of amines or acids, or substitution reactions can be carried out on previously prepared polyamides, whereby desired substituent groups can be appended to the polyamide chains, so as to provide the polyamides with desired properties. For instance, groups can be added which enable dyestuffs to bind tightly to polyamide chains.

An article by Bello et al. in Macromolecules Vol. 3, pages 98–100 (1970) describes the preparation of polymers having repeating units of the formulae

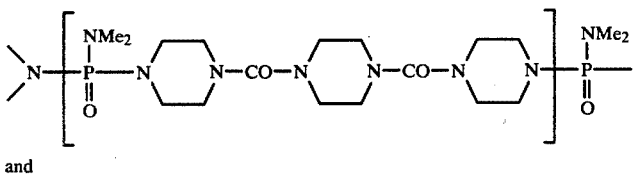

and

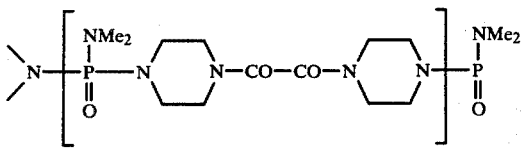

by the reaction of phosphoric dimethylamido bispiperazide

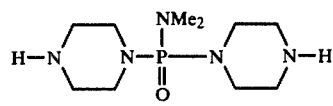

III with, respectively, piperazine-1,4-dicarbonyl chloride and oxalyl dichloride.

The object of the present invention is the synthesis of novel phosphorus- and nitrogen-containing polymers. A further object of this invention is the synthesis of polymers which are inherently flame-resistant or non-flammable.

STATEMENT OF THE INVENTION

The present invention provides polymers containing repeating units of the formula

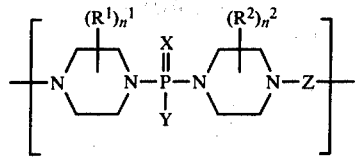

IV wherein
X is absent or represents an oxygen or sulphur atom, or a group of the formula $=N-R$, in which R represents a hydrogen, an aliphatic, cycloaliphatic or aromatic group, or a heterocyclic group;

Y represents an aliphatic, cycloaliphatic or aromatic hydrocarbon group or a heterocyclic group; a group of the formula $-NR_2$ in which each group R has the meaning given above, or the two groups R, together with the nitrogen atom to which they are attached, represent a N-containing heterocyclic ring; a group of the formula $-OR$ in which R has the meaning given above; or a group of the formula

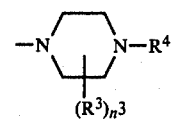

$R^1$, $R^2$ and $R^3$, which may be the same or different, each represents a substituent on the piperazine ring, $R^4$ represents a hydrogen atom or a substituted or unsubstituted aliphatic, cycloaliphatic, or heterocyclic radical or heterocyclic group, an acyl group, a sulphonyl group; or a substituted or unsubstituted carbamoyl group;

$n^1$, $n^2$ and $n^3$, which may be the same or different, each represents 0 or an integer; and Z represents a group of the formula $C=O$, $C=S$ or $-CO-CO-$; an organic dicarboxylic group of the formula

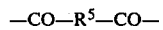

in which $R^5$ represents a substituted or unsubstituted aliphatic, cycloaliphatic or aromatic hydrocarbon radical, or a heterocyclic radical, or a group of the formula

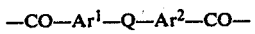—CO—Ar¹—Q—Ar²—CO— in which Ar¹ and Ar², which may be the same or different each represents an arylene group, and Q represents a group of the formula —O—, —S—, —SO—, —SO₂—,

—NR⁶— (wherein R⁶ represents an aliphatic, cycloaliphatic or aromatic radical or heterocyclic radical), —SiR₂⁶—, or is a divalent aliphatic or cycloaliphatic group; a group of the formula

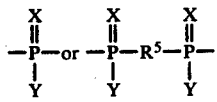

in which X, Y and R⁵ have the meanings given above—a group of the formula

—SO₂—, —SO—, —SO₂—R⁵—SO₂—,
—SO—R⁵—SO— or —SO₂—R⁵—SO— in which R⁵ has the meaning given above; or a group of the formula

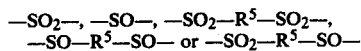

or a group of the formula

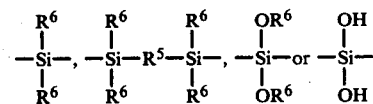

but wherein Y cannot be dimethylamino when X represents oxygen and n¹ and n² are both zero.

The present invention also provides a process for the production of such polymers which comprises reacting a bispiperazide of the formula

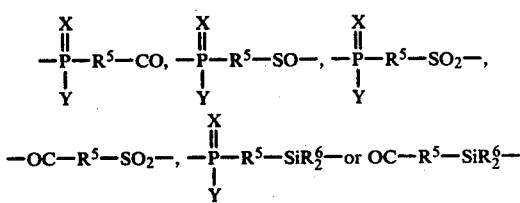

in which R¹, R², X, Y, n¹ and n² have the meanings given above, with a reactive derivative of an acid, having the formula

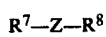 VII in which Z has the meaning given above, and R⁷ and R⁸, which may be the same or different, each represents a halogen atom or a hydroxy or alkoxy group.

DESCRIPTION OF THE INVENTION

According to one preferred embodiment of the invention, n¹ and n² both represent 0.

According to another preferred embodiment of the invention, X represents oxygen or sulphur, and Y represents an alkoxy, aryloxy or dialkylamino group.

According to a further preferred embodiment of the invention Z represents a diacyl radical derived from an aliphatic or aromatic dicarboxylic acid.

According to yet another preferred embodiment of the invention, R⁷ and R⁸ each represents chlorine.

If desired, it is possible to carry out polycondensation reactions in which either or both of the bispiperazide VI and the compound of formula VII forms part of a mixture with another amine or acid derivative respectively. These other amines or acids may have the same general formula, or the amine may be another polyamide-forming amine.

In the present invention, the symbol X can represent an oxygen or sulphur atom or a group =NR, or it can be absent. The bispiperazides and trispiperazides, used in the process according to the invention are therefore amides of phosphoric acid (when X represents oxygen), thiophosphoric acid (when X represents sulphur), phosphorimidic acid (when X represents =NR), and phosphorus acid (when X is absent).

The symbol Y can represent a group of the formula:

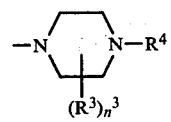 VIII in which case, the compounds used in the process according to the invention are trispiperazides. When Y has one of its other meanings, the compounds are bispiperazides.

Y can for example represent a substituted or unsubstituted hydrocarbon group which can be of aliphatic, cycloaliphatic or aromatic nature. Examples of suitable aliphatic groups are alkyl, such as methyl, ethyl, propyl, butyl, octyl, dodecyl, or octadecyl; alkenyl, such as allyl; or alkynyl, such as propargyl.

Examples of suitable cycloaliphatic groups are cycloalkyl, such as cyclohexyl, tetrahydronaphthyl or decahydronaphthyl; and cycloalkenyl, such as cyclohexenyl.

Examples of suitable aromatic hydrocarbon groups are aryl groups, such as phenyl, naphthyl, biphenyl, or phenanthryl; aralkyl, such as benzyl, or phenylethyl; and alkaryl, such as tolyl, dimethylphenyl, trimethylphenyl, cumyl, or p-octylphenyl.

Y can alternatively represent a heterocyclic group, linked to the phosphorus atom through a carbon atom, as in the tetrahydrofurfuryl or 2-pyridyl radicals.

Y can also represent a group of the formula —NR₂, in which each R represents a hydrogen atom, or an aliphatic, cycloaliphatic, or aromatic hydrocarbon group or a heterocyclic group. Examples of these hydrocarbon groups or heterocyclic groups are given above. Specific examples of suitable amino radicals are dimethylamino, diethylamino, dipropylamino, dibutylamino, monomethylamino, monoethylamino, monododecylamino, mono-$(C_{10-14})$ alkylamino, monooctadecylamino, anilino, p-dodecylanilino, and N-butylanilino.

Alternatively, both symbols R, and the nitrogen atom to which they are attached, can together represent a heterocyclic radical linked to the phosphorus atom through the nitrogen atom. Examples of such groups are morpholino, piperidino, tetrahydroquinolino, pyrrolidino etc. The compounds in which Y represents a further piperazino group are, of course, a special instance of this.

Y can also represent a group of the formula —OR in which R has the meaning given above. Examples of such groups are alkoxy, such as methoxy, ethoxy, propoxy, butoxy, dodecyloxy and octadecyloxy; and aryloxy such as phenoxy, tolyloxy, or benzyloxy.

Any of the above radicals can if desired, be substituted. The only limitation upon the nature of the substituents is that they should be inert under the conditions of the reaction employed in synthesizing the compound.

In the groups of the formula:

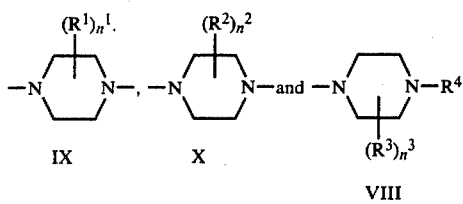

$R^1$, $R^2$ and $R^3$, which may be the same or different, represent substituents on the piperazine ring. Here again, the only limitation upon the nature of the substituent is that it should be inert under the conditions of the reaction used to synthesize the compound. The substituent can, for example, be one of the groups set out above for Y, provided that such a group is inert. When present, it can for example be an alkyl group, such as a methyl group. Alternatively, the substituent can have a meaning not set out above, insofar as it might be an appropriate group for attachment to phosphorus: for example, an oxo group. Specific examples of substituted piperazine groups are 2,5-dimethylpiperazino and 2,5-dioxopiperazino groups, $n^1$, $n^2$ and $n^3$, which can be the same or different, each represents 0 or an integer, preferably 0, 1 or 2: $R^4$ can represent a hydrogen atom or a substituted or unsubstituted aliphatic, cycloaliphatic or aromatic hydrocarbon group or a heterocyclic group. Examples of suitable groups are set out above. Specifically preferred groups $R^4$ include alkyl, such as methyl, ethyl, phenyl, and substituted groups such as β-cyanoethyl and β-carbethoxyethyl. $R^4$ can also represent an acyl group, e.g. of an aliphatic, cycloaliphatic, aromatic or heterocyclic carboxylic acid, such as acetic, propionic, butyric or stearic acid, cyclohexane carboxylic acid, benzoic acid, toluic acid, nicotinic acid or a methylnicotinic acid.

Alternatively $R^4$ can represent a sulphonyl group, for example a methane sulphonyl, benzene sulphonyl or toluene sulphonyl group. $R^4$ can also represent a substituted carbamoyl group —CO—NHR wherein R has the meaning given above. An example of such a group is phenylcarbamoyl.

These piperazide compounds are described in co-pending Application Ser. No. 628,288 filed Nov. 3, 1975 now U.S. Pat. No. 4,081,445, issued Mar. 28, 1978.

They can readily be prepared by reacting a compound of the formula

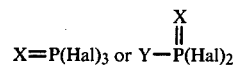

in which X and Y have the meanings given above and Hal represents chlorine or bromine, with a piperazine derivative of the formula

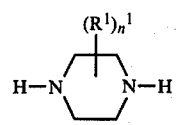

in which $R^1$ and n have the meanings given above. This reaction can conveniently be carried out in an inert solvent, e.g. benzene, toluene or xylene at an elevated temperature, e.g. 60° to 80° C.

In the acid moiety of the polymers, Z can, according to one embodiment of the invention, represent a group of the formula >CO, >CS or —CO—CO—, in which case the polymers are, respectively, polyamides of carbonic, thiocarbonic and oxalic acid.

According to another embodiment of the invention, the acids, which can be employed as such, or as their esters or halides, in the production of the polymers, have the formula

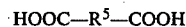

In this formula, $R^5$ represents a substituted or unsubstituted aliphatic, cycloaliphatic, aromatic radical, or a heterocyclic radical. Suitable aliphatic radicals are alkylene radicals, such as polymethylene radicals; alkylidene radicals, such as ethylidene or isopropylidene radicals; alkenylene radicals, such as —CH=CH—; and alkynylene radicals, such as —C≡C—. Examples of acids in which $R^5$ represents a methylene or polymethylene chain include malonic, succinic, glutaric, adipic, pimelic and sebacic acids. Acids in which $R^5$ is alkylidene are, e.g. monomethylmalonic, dimethylmalonic and α-methylsuccinic acid. Acids in which $R^5$ is alkenylene include maleic and fumaric acids. Acids in which $R^5$ is alkynylene include acetylene dicarboxylic acid.

Suitable cycloaliphatic acids are saturated or unsaturated acids, such as cyclohexane-1,2-dicarboxylic acid and cyclohexene-1,2-dicarboxylic acid.

Suitable aromatic acids are those in which $R^5$ represents an o-, m- or p-phenylene group, a naphthylene group or a biphenylene group, e.g. phthalic acid, isophthalic acid, terephthalic acid, naphthylene-1,8-dicarboxylic acid or biphenyl-4,4'-dicarboxylic acid.

Another group of acids that can be employed in the process according to the invention have the general formula

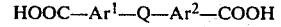

in which $Ar^1$ and $Ar^2$, which may be the same or different, each represents an arylene group (which may be substituted or unsubstituted) and Q represents a group of the formula —O—, —S—,

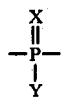

(wherein X and Y have the meanings given above, —SO—, —SO$_2$—, NR$^6$ or SiR$_2^6$ (wherein R$^6$ represents an aliphatic, cycloaliphatic or aromatic radical or heterocyclic radical), or Q can represent a divalent aliphatic or cycloaliphatic group. Examples of such acids are diphenyl ether-4,4'-dicarboxylic acid, diphenyl sulphide-4,4'-dicarboxylic acid, diphenyl sulphoxide-4,4'-dicarboxylic acid, diphenyl sulphone-4,4 '-dicarboxylic acid, diphenyl methylamine-4,4'-dicarboxylic acid, diphenyl dimethylsilane-4,4'-dicarboxylic acid, diphenyl methane-4,4'-dicarboxylic acid, and 2,2-diphenylpropane-4,4'-dicarboxylic acid.

Another group of acids has the formula

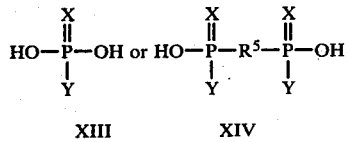

in which X, Y and R$^5$ have the meanings given above. Examples of such acids include monophenyl phosphate, monoacetyl phosphate, monophenyl phosphite and N''-methyl monophenyl phosphoamidate.

Yet another group of acids is constituted by the sulphur-containing acids: HO.SO$_2$.OH, HO.SO.OH, HO.-SO$_2$.R$^5$.SO$_2$H, HO.SO.R$^5$.SO.OH and HO.SO$_2$.R$^5$-.SO.OH, i.e. sulphuric acid, sulphurous acid, hydrocarbon disulphonic acids (e.g. butane-1,4-disulphonic acid, or benzene disulphonic acid), hydrocarbon disulphinic acids and hydrocarbon monosulphonic monosulphinic acids.

In another group of polymers, the group Z has the formula

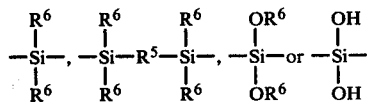

In such groups, R$^6$ is preferably methyl or phenyl.

It is also possible to use mixed bifunctional acids

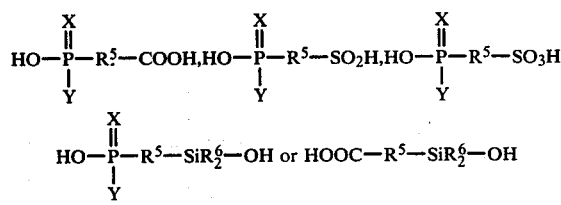

in which X, Y, R$^5$ and R$^6$ have the meanings given above.

Although the polymer-forming reaction according to the invention can be carried out using an acid or ester of the formula

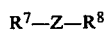

in which R$^7$ and R$^8$ each represents a hydroxy or alkoxy group, it is most conveniently carried out using a dihalide, particularly a dichloride of the formula ZCl$_2$.

Reaction between the dichloride and the piperazido reactant can be carried out in homogeneous solution in a polar organic solvent, or as an interfacial reaction employing two immiscible solvents, one of which is generally water.

Suitable polar organic solvents include carbon tetrachloride, chloroform, dimethyl formamide (DMF) and dimethyl sulphoxide (DMSO). For good results, it is desirable that an acid-acceptor should be present in order to take up the HCl which is generated as the reaction progresses. Organic bases, e.g. triethylamine are preferably employed for the homogeneous polycondensation, and inorganic bases, e.g. sodium hydroxide or potassium hydroxide, are preferably employed for the interfacial polycondensation.

The polyamides according to the invention can be cast from solution into films, or can be formed into shaped articles, such as filaments. According to one embodiment of the invention, a yarn can be pulled directly from the interface when polycondensation is carried out in heterogeneous systems.

The solid polyamides are flame-retardant or non-burning, and can be used, by themselves or in combination with other polyamides to provide flame-retardant or non-burning polymers.

Practice of the process of this invention will be apparent to those skilled in the art from the following illustrative examples.

DESCRIPTION OF SPECIFIC EMBODIMENTS

Typical polycondensation procedures, on a laboratory scale are as follows:

1. HOMOGENEOUS POLYCONDENSATIONS

Using chloroform (CHCl$_3$) or dimethylformamide (DMF) as solvent, such polycondensations have been carried out according to the following standard procedure:

To 0.005 mole of the bispiperazidophosphorus compound and 0.010 to 0.012 mole of triethylamine, dissolved in 25 ml of dry solvent, is added, in one portion at room temperature with gentle stirring, 0.005 mole of the diacid chloride dissolved in 25 ml of dry solvent. Usually a temperature rise from 20°–22° C. to 30°–35° C. within 5 minutes was observed, and the mixture was stirred for 15 to 60 minutes.

The reaction mixture was worked up as follows:

(a) If DMF was used as solvent, the reaction mixture was added dropwise with stirring to 600 ml of water. If the polyamide did not precipitate, dry ice was added to provoke precipitation.

The precipitated polyamide was filtered off, washed with water, and dried in vacuo over P$_2$O$_5$ at 40°–70° C./1 mm.

(b) If CHCl$_3$ was used as solvent, the reaction mixture was precipitated with petroleum ether or n-hexane (600 ml) and the polymer was filtered off, washed with water to remove triethylamine hydrochloride and dried in vacuo over P$_2$O$_5$ at 40°–70° C./1 mm. Sometimes the polyamide became a sticky mass on washing with water. When this happened, the polyamide was dissolved in chloroform (30–50 ml), ethanol and benzene were added and the water and solvents were distilled off under reduced pressure at 60°–100° C. The remaining polyamide was redissolved in chloroform (30 ml), and precipitated with petroleum ether or n-hexane (500–600 ml) or, if precipitation was not possible, the polyamide was isolated by freeze drying from a chloroform solution.

H. HETEROGENEOUS (INTERFACIAL) POLYCONDENSATIONS

The systems $CHCl_3/H_2O$ and $CCl_4/H_2O$ were used according to following standard procedure:

To a solution of 0.005 mole of the bispiperazidophosphorus compound and 0.012 mole of potassium hydroxide in 40 ml of water, was added in one portion, at room temperature and with vigorous stirring, a solution of 0.005 mole of the diacid chloride in 40 ml of chloroform or carbon tetrachloride, and the mixture was stirred for 15 to 30 minutes.

When the reaction was carried out using 0.10 mole of the bispiperazidophosphorus compound and 0.1 mole of the diacid chloride in 600 to 750 ml of solvent and 200 to 270 ml of water, the temperature of the reaction mixture rose from 20°–22° C. to about 35° C. within 5 minutes, due to the heat evolved.

In the mixture $CCl_4/H_2O$, the polyamide precipitated as it was formed, and formed a thick swollen lump, but in the system $CHCl_3/H_2O$, the polymer remained dissolved. In general there was no considerable difference between the results (yield-molecular weight) obtained in the two solvent systems. An emulsion was, however, often formed when using the $CHCl_3/H_2O$ system, necessitating the use of different methods for isolating the polyamides from the various reaction mixtures:

1. From a $CCl_4/H_2O$ mixture

The precipitated polyamide was filtered off, cut into small pieces, washed with water and dissolved in 60 to 100 ml of chloroform.

This solution was washed twice with 70 to 100 ml of water, to remove inorganic and organic potassium salts, and concentrated to about 30 ml in vacuo, and the polyamide was isolated by precipitation with 600 ml of petroleum ether or n-hexane. Then it was filtered off and dried over $P_2O_5$ in vacuo (1 mm) at 40°–70° C.

2. From a $CHCl_3/H_2O$ mixture (a) When no emulsion was formed, or when separation between the chloroform and the water layer still occurred, the organic layer was separated, washed twice with 70–100 ml of water to remove potassium salts, and concentrated in vacuo to about 30 ml, and the polyamide was precipitated by pouring this solution into 600 ml of petroleum ether, filtered off and dried.

Sometimes an additional amount of polymer could be recovered by extracting the water layer and the wash water with chloroform, and by pouring the water-washed and concentrated chloroform solution into hexane.

(b) When the separation of the layers was too difficult, or when an emulsion was formed, the chloroform was stripped off in a thin film evaporator at temperature 60°–90° C./20 mm and the remaining water was decanted from the precipitated polymer, which was rinsed with 100 ml of water and redissolved in 60 to 100 ml chloroform. This solution was water-washed and concentrated, and the polyamide was precipitated with 600 ml of n-hexane, filtered off, and dried.

If during purification of the polyamide by washing a chloroform solution with water, an emulsion was again formed, the chloroform was distilled off at reduced pressure, the supernatant water was decanted from the precipitated polymer, and the rest of the water was removed as an azeotrope with some added alcohol and benzene. The remaining polyamide was further treated as above.

If precipitation of the polymer was not possible, the polyamide was isolated by freeze drying from chloroform solution. The ratio of organic solvent: water can be varied over a wide range, e.g. 1:1 to 3:1, with no substantial variation in the results obtained.

Details of small-scale syntheses of polyamides, using terephthaloyl chloride and sebacoyl chloride, with various bis-piperazido compounds are set out in Table 1 below. The solvent systems yields and reduced viscosity (a measure of molecular weight) are also set.

The polyamides were all white solids and several were slightly hygroscopic. The reduced viscosity was measured in 0.4% by weight solution in $CHCl_3$ at 25° C.

TABLE 1

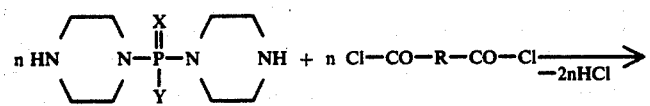

XV                                      XVI

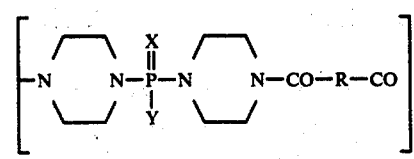

XVII

| | POLYAMIDE | | | Interfacial Polycondensation system | Yield % | Viscosity η red (in dl/g) |
|---|---|---|---|---|---|---|
| No. | X | Y | R | | | |
| IV | O | —O—C$_6$H$_5$ | —C$_6$H$_4$-(p) | CHCl$_3$/H$_2$O | 103$^a$ 102.7$^a$ | 0.72 1.10 |
| V | O | —N(C$_3$H$_7$)$_2$ | —C$_6$H$_4$-(p) | CHCl$_3$/H$_2$O | 78.8 | 0.19 |
| VI | S | —O—C$_2$H$_5$ | —C$_6$H$_4$-(p) | CHCl$_3$/H$_2$O | 100 | 0.475 |
| VII | S | —O—C$_6$H$_5$ | —C$_6$H$_4$-(p) | CHCl$_3$/H$_2$O | 96.0 | 0.42 |
| VIII | O | —O—C$_6$H$_5$ | —(CH$_2$)$_8$— | CCl$_4$/H$_2$O | 88.1 | 0.61 |

TABLE 1-continued

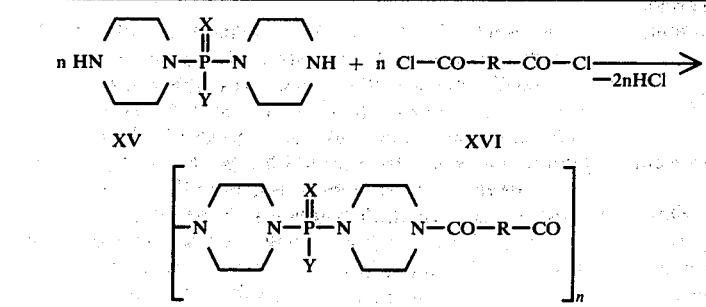

|  | POLYAMIDE | | | Interfacial Polycondensation | Yield | Viscosity η red |
|---|---|---|---|---|---|---|
| No. | X | Y | R | system | % | (in dl/g) |
| IX | O | —N(C$_3$H$_7$)$_2$ | —(CH$_2$)$_8$— | CCl$_4$/H$_2$O | 78.6 | 0.44 |
| X | S | —O—C$_2$H$_5$ | —(CH$_2$)$_8$— | CHCl$_3$/H$_2$O | 97.3 | 0.425 |
| XI | S | —O—C$_6$H$_5$ | —(CH$_2$)$_8$— | CCl$_4$/H$_2$O | 93.0 | 0.45 |

[1]KOH was used as HCl acceptor.
[a]Probably the polymer still contained some absorbed water.

The polyamides had good solubility in chloroform and dimethyl formamide, some were soluble in methanol and ethanol, and a few in dioxane, benzene and acetone. The polyamides were not soluble in carbon tetrachloride, petroleum ether, ether, or paraffinic oils.

The polyamides show, in general, melting temperatures in the range of 150° to 280° C., and start to decompose at about 300° C. The polyamides derived from sebacoyl chloride have lower melting and decomposition temperatures than derivatives of terephthaloyl chloride. Details are given below in Table 2 which sets out results obtained by heating the polyamides at a rate of 10° C. per minute in a capillary tube, and by differential thermoanalysis.

TABLE 2

XVII

|  | POLYAMIDE | | | Melting Temp. | Decomposition |
|---|---|---|---|---|---|
| No. | X | Y | R | (°C.) | temp. (°C.) |
| IV | O | —O—C$_6$H$_5$ | —C$_6$H$_4$-(p) | 250–270 | 340–350 |
| V | O | —N(C$_3$H$_7$)$_2$ | —C$_6$H$_4$-(p) | 215–255 | 350–380 |
| VI | S | —O—C$_2$H$_5$ | —C$_6$H$_4$-(p) | 280–290 | 310–320 |
| VII | S | —O—C$_6$H$_5$ | —C$_6$H$_4$-(p) | 268–280 | 360–370 |
| VIII | O | —O—C$_6$H$_5$ | —(CH$_2$)$_8$- | 170–190 | 260–300 |
| IX | O | —N—(C$_3$H$_7$)$_2$ | —(CH$_2$)$_8$- | 100–154 | 270–300 |
| X | S | —O—(C$_2$H$_5$) | —(CH$_2$)$_8$- | 240–270 | 288–290 |
| XI | S | —O—C$_6$H$_5$ | —(CH$_2$)$_8$- | 210–230 | 360–380 |

Film Forming Properties of the Polyamides

Films cast from chloroform solutions of the polyamides, in general have a good appearance. They are colorless, flexible and non-burning or self-extinguishing when ignited in a Bunsen flame.

Polyamide films dissolve in 10 N sulphuric acid within a few hours, but have good resistance to 0.1 N sulphuric acid in which they turn hazy and show only small changes in weight when immersed for 6 to 14 days.

The polyamide films are resistant to caustic solutions; when immersed in 10 N NaOH and in 0.1 N KOH at room temperature the film remains unchanged or turn hazy; in some instances, small changes in weight are observed.

The polyamide films seen unchanged on ageing, no change in appearance or solubility in chloroform were observed on film strips which were exposed to daylight and air for several months.

Mechanical Properties of the Polyamides

Two polyamides, sample (IV) (X=O; Y=O—C$_6$H$_5$; R=(C$_6$H$_4$—)η$_{0.4}$=0.66 dl/g (CHCl$_3$; 25° C.) and sample V (X=O; Y=N(C$_3$H$_7$)$_2$; R=—C$_6$H$_4$—)η$_{0.4}$=0.16 dl/g (CHCl$_3$; 25° C.) were selected for testing because they represent extremes of molecular weight. Sample V was moulded (325° F.; 163° C.) directly from the powder since it darkened severely on roll milling. Sample IV was milled and moulded at 400° F. (204.4° C.). By minimizing processing times and temperatures, it was possible to produce amber colored specimens. However they were very brittle, which is likely due to their relatively low molecular weights.

On the other hand it was possible to produce polymer fibres by interfacial spinning. The polymer film formed at the interface of a carbon tetrachloride solution of terephthaloyl chloride and an aqueous alkaline solution of phenyl bispiperazidophosphate could be pulled out from the mixture as a continuous strand. The polyamide strand wound up from the mixture had a reduced viscosity of 0.485 dl/g at 0.4% wt (CHCl$_3$; 25° C.).

(a) Homogeneous Reaction Systems

EXAMPLE 1

Preparation of polyamide IV

To 0.005 mole (1.552 g) of phenyl bispiperazidophosphate and 0.01 mole (1.4 ml) of triethylamine in 25 ml of chloroform (free of ethanol) was added, in one portion at room temperature with stirring, 0.005 mole (1.015 g) of terephthaloyl chloride dissolved in 25 ml of chloroform. The reaction temperature rose to 35° C. within 5 minutes, and the mixture was stirred for 15 minutes. From it the polyamide was precipitated by pouring the solution into 600 ml of vigorously stirred n-hexane. The polyamide was filtered off, thoroughly washed with water and dried over P$_2$O$_5$ at 70° C. in vacuo (1 mm).

Yield: 2.092 g IV (95%); $[\eta]=0.425$ dl/g; $\eta_{red}=0.46$ dl/g (CHCl$_3$; 0.40 g/dl; 25° C.). Melting range 258°-270° C.; Decomposition temp. 350° C.

The polyamide could be cast from a chloroform solution to give a colourless, flexible film, which was non-burning.

EXAMPLE 2

Preparation of polyamide VII

To a solution of 0.005 mole (1.632 g) of phenyl bis-piperazidothiophosphate and 0.01 mole (1.4 ml) of triethylamine in 25 ml of DMF was added, in one portion with stirring, 0.005 mole (1.05 g) of terephthaloyl chloride in 25 ml of DMF. The temperature rose from 22° C. to 35° C. within 5 minutes. The mixture was stirred for 5 minutes and kept at ambient temperature overnight, and was then poured into 600 ml of water. An emulsion was obtained, from which precipitation of the polyamide was provoked by dry ice.

The polymer was filtered off, washed with water and dried at 70° under vacuum (1 mm) over P$_2$O$_5$.

Yield of VII: 2.007 g (87.9%); $[\eta]=0.13$ dl/g; $\eta_{red}=0.155$ dl/g (0.4 g/dl; CHCl$_3$; 25° C.). Melting range: 268°-280° C.; decomposition temperature 360° C. This polymer formed a white-hazy, very brittle film, when cast from a chloroform solution.

EXAMPLE 3

Preparation of polyamide VIII

To a solution of 0.005 mole (1.552 g) of phenyl bis-piperazidophosphate and 0.010 mole (1.4 ml) of triethylamine in 35 ml of chloroform was added, in one portion with stirring, 0.005 mole (1.066 ml) of sebacoyl chloride in 45 ml of chloroform. The temperature rose from 22° to 32° C. and the mixture was stirred for 15 minutes, during which it remained a clear solution. The mixture was concentrated in vacuo and poured into 600 ml petroleum ether. The polyamide precipitated as a white powder and was filtered off. On washing with water it formed a sticky mass which was dried in vacuo over P$_2$O$_5$.

The polymer was redissolved in chloroform and isolated by freeze drying in the form of a white foam.

Yield of VIII: 2.142 g (89.9%); $[\eta]=0.133$ dl/g; $\eta_{red}=0.145$ dl/g (CHCl$_3$; 0.4 g/dl; 25° C.). Melting range 70°-80° C; decomposition temperature 240°-250° C.

When cast from a chloroform solution, the polymer formed a colourless flexible film which was non-burning.

(b) Heterogeneous Reaction Systems

EXAMPLE 4

Preparation of polymer IV

To a solution of 0.005 mole (1.015 g) of terephthaloyl chloride in 160 ml chloroform was added, in one portion at room temperature with viborous stirring, a solution of 0.005 mole (1.552 g) of phenyl bispiperazido-phosphate and 0.012 mole of potassium hydroxide in 72 ml of water, and the mixture was stirred for 30 minutes. A milky solution was formed which was separated into a chloroform layer and a milky water layer in a separation funnel. The chloroform layer was water-washed, and chloroform and residual water were stripped off. The residue was redissolved in 40 ml of chloroform and filtered, and the polyamide was precipitated by pouring this solution into 400 ml of n-hexane. The polymer was filtered off and dried in vacuo over P$_2$O$_5$.

Yield: 1.808 g $[\eta]=0.95$ dl/g; $\eta_{red}=1.103$ dl/g (CHCl$_3$; 25° C.; 0.40 g/dl). Melting range 280°-285° C., decomposition temperature 360° C.

From the collected water layer and wash waters, chloroform was evaporated by boiling. The precipitated polymer was filtered off, water washed, redissolved in chloroform, filtered and precipitated with hexane. An additional amount of 0.453 g of IV, $\eta_{red}$: 1.139 dl/g (CHCl$_3$; 0.4 g/dl; 25° C.) was obtained.

Total yield: 2.261 g (102.7%) (probably the polymer still contained some solvent or absorbed water).

EXAMPLE 5

Preparation of polyamide VI

To a solution of 0.005 mole (1.015 g) of terephthaloyl chloride in 175 ml chloroform at 55° C. was added, in one portion with stirring, 0.005 mole (1.392 g) of ethyl bis-piperazidothiophosphate and 0.012 mole of potassium hydroxide in 77 ml of water at 55° C. The mixture was stirred for 30 minutes and the chloroform layer was separated from the milky water layer. The latter was extracted with chloroform and the collected chloroform solutions were washed with water. Chloroform and residual water were stripped off under vacuum, the residue was redissolved in 30 ml chloroform, filtered and poured into 600 ml hexane.

The precipitated polyamide was filtered off and dried. Yield: 2.05 g (100%) $[\eta]=0.447$ dl/g; $\eta_{red}=0.475$ dl/g (CHCl$_3$; 25° C.; 0.40 g/dl.). Melting range 292°-300° C.

Decomposition temperature: 320° C. The polymer could be cast from a chloroform solution into a colourless flexible film which was non-burning.

EXAMPLE 6

Preparation of polyamide IX

To 0.025 mole (7.935 g) of phosphoric dipropylamido bispiperazido triamide and 0.05 mole (2.80 g) of potassium hydroxide in 200 ml of water was added with vigorous stirring, 0.025 mole (5.332 ml) of sebacoyl chloride dissolved in 200 ml of carbon tetrachloride, and the mixture was stirred for 30 minutes. The precipitated polymer was filtered off and dissolved in 250 ml of chloroform, and this mixture was washed with water. Chloroform was stripped off and after addition of 50 ml of benzene and 50 ml of ethanol, the rest of the water and the solvents were stripped off, and the residue was sucked dry under vacuum (0.5 mm). The polyamide was obtained as a hard, white foam.

Yield: 28.5 g (78.57%); $[\eta]=0.425$ dl/g; $\eta_{red}=0.44$ dl/g (CHCl$_3$; 25° C.; 0.40 g/dl). Melting Temperature 170° C. Decomposition temperature 300° C. The polymer could be cast from a chloroform solution into a colourless, flexible film, which was self-extinguishing.

EXAMPLE 7

Preparation of polyamide X

To 0.005 mole (1.196 g) of sebacoyl chloride dissolved in 65 ml of chloroform was added, at room temperature with stirring, 0.005 mole (1.392 g) of ethyl bispiperazidothiophospate and 0.012 mole of potassium hydroxide in 60 ml of water. The mixture was stirred at room temperature for 2 hrs., an additional amount of 80 ml of chloroform and 20 ml of water was added, the chloroform layer was separated and the water layer was extracted once with chloroform. The collected chloroform solutions were water washed; and the solvent and the rest of the water was stripped off under vacuum.

The crude polymer was redissolved in 30 ml of chloroform; the solution was filtered and poured into 400 ml of petroleum ether. The precipitated polymer was filtered off and dried.

Yield: 2.164 g (97.3%); [η]=0.40 dl/g; η$_{red}$=0.425 dl/g (CHCl$_3$; 25° C; 0.40 g/dl). Melting range: 230°-250° C.; Decomposition temperature 290° C.

The polymer formed a colourless flexible film which was self-extinguishing.

EXAMPLE 8
Preparation of polyamide VIII

To a solution of 0.005 mole (1.552 g) of phenyl bis-piperazidophosphate and 0.012 mole of potassium hydroxide in 40 ml of water is added in one portion, with stirring, at room temperature, 0.005 mole (1.066 g) of sebacoyl chloride in 40 ml of carbon tetrachloride, and the mixture was stirred for 15 minutes, during which the swollen polymer formed one lump. The polyamide was washed with water, dried over P$_2$O$_5$ in vacuo at 60° C., redissolved in chloroform and precipitated by petroleum ether.

Yield: 2.047 (85.9%); [η]=0.80 dl/g; η$_{red}$=0.88 dl/g (CHCl$_3$; 25° C.; 0.40 g/dl); melting range: 173°-180° C.; decomposition temperature 260° C.

The polymer could be cast from a chloroform solution into a colourless, flexible film which was non-burning.

Although this invention has been illustrated by reference to specific embodiments, it will be apparent to those skilled in the art that various changes and modifications may be made which clearly fall within the scope of this invention.

What we claim is:
1. A solid polymer consisting essentially of repeating units of the formula:

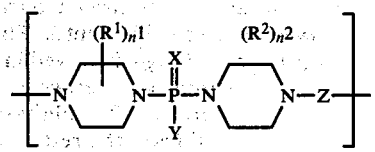

wherein
(i) X is absent or represents oxygen or sulphur or =N—R;
(ii) Y represents an aliphatic, cycloaliphatic, or aromatic hydrocarbon group or an N-containing heterocyclic group; or —OR or —NR$_2$; or —NR$_2$ in which the two R groups, together with the nitrogen atom to which they are attached, represent an N-containing heterocyclic ring; or a group of the formula:

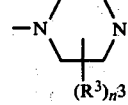

wherein R, R$^1$, R$^2$, and R$^3$ represent hydrogen, or an aliphatic, cycloaliphatic, or aromatic hydrocarbon group or an N-containing heterocyclic group;
(iii) R$^4$ represents hydrogen or an aliphatic group, a cycloaliphatic group, an N-containing heterocyclic group, an acyl group, a sulfonyl group, or an unsubstituted carbamoyl group;
(iv) n$^1$, n$^2$, and n$^3$ each represent zero or an integer;
(v) Z represents OC—R$^5$—SiR$_2^6$—
(vi) R$^5$ and R$^6$ represent an aliphatic, cycloaliphatic or aromatic hydrocarbon radical, or a heterocyclic radical.

2. A solid polymer as claimed in claim 1 wherein n$^1$ and n$^2$ both are zero.

3. A solid polymer as claimed in claim 1 wherein Y is alkoxy, aryloxy, or dialkylamino.

4. A solid polymer consisting essentially of repeating units of the formula:

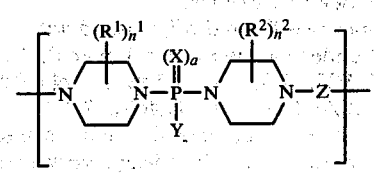

wherein
(i) X is oxygen or sulfur or =N—R and a is 0 or 1;
(ii) Y represents an aliphatic, cycloaliphatic, or aromatic hydrocarbon group; or —OR; or —NR$_2$ or —NR$_2$ in which the two R groups, together with the nitrogen atom to which they are attached, represent an N-containing heterocyclic ring; or a group of the formula:

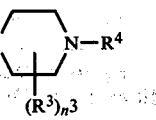

wherein R, R$^1$, R$^2$, and R$^3$ represent hydrogen or an aliphatic, cycloaliphatic, or aromatic hydrocarbon group;
(iii) R$^4$ represents hydrogen or an aliphatic group, a cycloaliphatic group, an acyl group, or an unsubstituted carbamoyl group;
(iv) n$^1$, n$^2$, and n$^3$ each represent 0 or an integer;
(v) Z represents —OC—R$^5$—SiR$_2^6$—
(vi) R$^5$ and R$^6$ represent an aliphatic, cycloaliphatic, or aromatic hydrocarbon group.

5. A solid polymer as claimed in claim 4 wherein n$^1$ and n$^2$ are zero.

6. A solid polymer as claimed in claim 4 wherein a is 1 and Y represents alkoxy, aryloxy, or dialkylamino.

7. A solid polymer consisting essentially of repeating units of the formula:

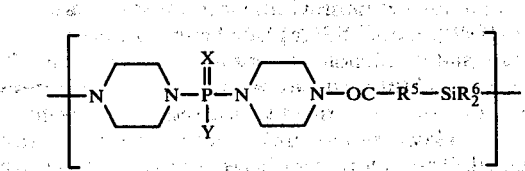

wherein
(i) X is oxygen or sulfur or is absent;

(ii) Y represents an aliphatic, cycloaliphatic, or aromatic hydrocarbon group; or —OR; or —NR$_2$ or —NR$_2$ in which the two R groups, together with the nitrogen atom to which they are attached, represent an N-containing heterocyclic ring; or a group of the formula:

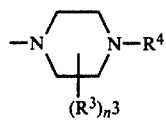

wherein R and R$^3$ represent hydrogen or an aliphatic or cycloaliphatic or aromatic hydrocarbon group;

(iii) R$^4$ represents hydrogen or an aliphatic group, a cycloaliphatic group, an acyl group, or an unsubstituted carbamoyl group;

(iv) n$^3$ represents zero or an integer; and (v) R$^5$ and R$^6$ represent an aliphatic, cycloaliphatic, or aromatic hydrocarbon group.

8. A solid polymer consisting essentially of repeating units of the formula:

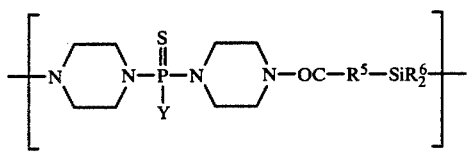

wherein (i) Y represents an aliphatic, cycloaliphatic, or aromatic hydrocarbon group; or —OR; or —NR$_2$ or —NR$_2$ in which the two R groups, together with the nitrogen atom to which they are attached, represent an N-containing heterocyclic ring; or a group of the formula:

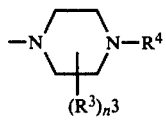

wherein R and R$^3$ represent hydrogen or an aliphatic of the cycloaliphatic or aromatic hydrocarbon group;

(ii) R$^4$ represents hydrogen or an aliphatic group, a cycloaliphatic group, an acyl group, or an unsubstituted carbamoyl group;

(iii) n$^3$ represents zero or an integer; and (iv) R$^5$ and R$^6$ represents an aliphatic, cycloaliphatic, or aromatic hydrocarbon groups.

9. A solid polymer consisting essentially of repeating units of the formula:

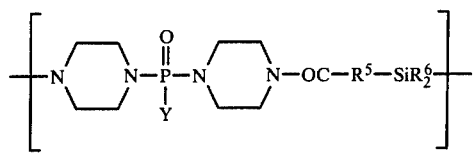

wherein (i) Y represents an aliphatic, cycloaliphatic, or aromatic hydrocarbon group; or —OR; or —NR$_2$ or —NR$_2$ in which the two R groups, together with the nitrogen atom to which they are attached, represent an N-containing heterocyclic ring; or a group of the formula:

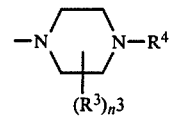

wherein R and R$^3$ represent hydrogen or an aliphatic of the cycloaliphatic or aromatic hydrocarbon group;

(ii) R$^4$ represents hydrogen or an aliphatic group, a cycloaliphatic group, an acyl group, or an unsubstituted carbamoyl group;

(iii) n$^3$ represents zero or an integer; and (iv) R$^5$ and R$^6$ represent an aliphatic, cycloaliphatic, or aromatic hydrocarbon groups.

10. A process for the production of a solid polymer as claimed in claim 1 which comprises
reacting a bispiperazide of the formula:

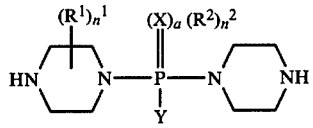

with a reactive derivative of an acid, said derivative having the formula:

R$^7$—Z—R$^8$ wherein Z is —OC—R$^5$—SiR$_2^6$—;
R$^5$ and R$^6$ represent an aliphatic, cycloaliphatic, or aromatic hydrocarbon group; and
R$^7$ and R$^8$ represent halogen, hydroxy, or alkoxy.

11. A process for the production of a solid polymer as claimed in claim 10 which comprises
reacting a bispiperazide of the formula:

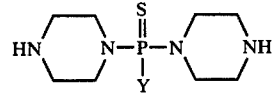

with R$^7$—OC—R$^5$—SiR$_2^6$—R$^8$.

12. A process for the production of a solid polymer as claimed in claim 10 which comprises
reacting a bispiperazide of the formula:

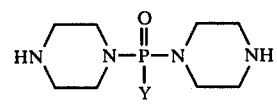

with R$^7$—OC—R$^5$—SiR$_2^6$—R$^8$.

* * * * *

UNITED STATES PATENT AND TRADEMARK OFFICE
CERTIFICATE OF CORRECTION

PATENT NO. : 4,180,641
DATED : December 25, 1979
INVENTOR(S) : Johny C. Hermans

It is certified that error appears in the above—identified patent and that said Letters Patent is hereby corrected as shown below:

Column 17, line 64, correct the spelling of "represent".

Column 18, line 35 correct the formula to read:

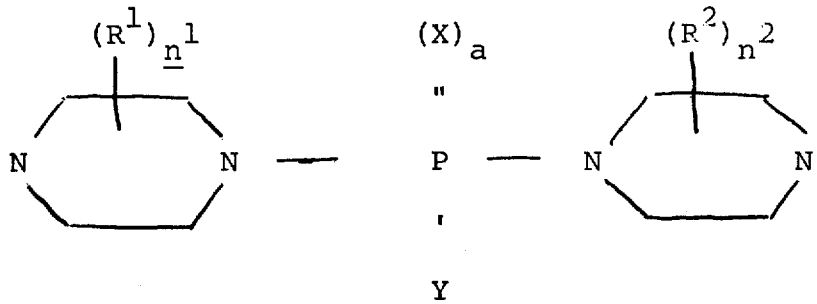

Signed and Sealed this

Seventh Day of October 1980

[SEAL]

Attest:

Attesting Officer

SIDNEY A. DIAMOND

Commissioner of Patents and Trademarks